Sept. 18, 1973 L. M. ANDERSSON 3,759,772
METHOD AND APPARATUS FOR OBTAINING TRANSVERSE MUTUAL
JOINING OF SUPERIMPOSED CONTINUOUS WEBS
Filed Aug. 20, 1971
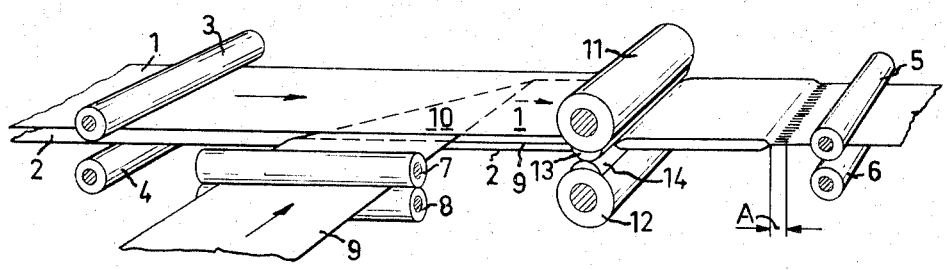

United States Patent Office 3,759,772
Patented Sept. 18, 1973

3,759,772
METHOD AND APPARATUS FOR OBTAINING TRANSVERSE MUTUAL JOINING OF SUPERIMPOSED CONTINUOUS WEBS
Lars Marten Andersson, Molnlycke, Sweden, assignor to Molnlycke AB, Goteborg, Sweden
Filed Aug. 20, 1971, Ser. No. 173,377
Claims priority, application Sweden, Aug. 21, 1970, 11,422/70
Int. Cl. B32b *31/00*
U.S. Cl. 156—270         5 Claims

ABSTRACT OF THE DISCLOSURE

The present invention relates to a method and an apparatus for obtaining transverse mutual joining of superimposed continuous webs. The method is mainly characterized in that a thermoplastic web is inserted between two superimposed continuous running webs. All the webs are then subjected to heat and pressure in an area where the actual joining is effected, the additional, thermoplastic web being inserted at a speed lower than the speed of the webs which are to be joined together. The apparatus is basically characterized by feeding means for the webs to be joined together and for the additional thermoplastic web. It is further characterized by means for applying heat and pressure on all the webs in the area where the joining is to be effected. The feeding means for the thermoplastic web have a lower speed than the feeding means for the webs to be united and are arranged, as seen in the direction of movement of the webs, in front of the heat and pressure applying means and at one side edge of the webs in order to feed the additional, thermoplastic web between the superimposed webs and at an angle to said side edge.

---

The present invention relates to a method and an apparatus for obtaining transverse mutual joining of superimposed continuous webs.

Different solutions have been proposed in order to attain such joining of fast moving webs. One of these solutions has been to apply a glue on one of the webs and then press the webs together by means of a pair of rollers. However, this implies the need for a tool which can apply the glue rapidly and with high precision on one of the webs. Such an implement is difficult and expensive to manufacture.

Another proposed solution is to provide at least one of two superimposed webs with a heat-sensitive adhesive agent and effect the joining by means of a pair of heated clamping jaws rotating on rollers. However, with such a procedure, the web must contain a moderately large amount of binder, which makes the web hard and smooth and increases the costs out of proportion.

It has also been suggested that a thermoplastic web be placed between the superimposed webs which are intended to be joined together. This joining occurs when the webs are subjected to heat and pressure. However, this procedure is expensive due to an unnecessarily high consumption of the thermoplastic web.

The aim of the invention is to overcome said drawbacks and produce a new, improved and less expensive way of effecting joining of the type mentioned in the preamble. To this end, the invention is based on the idea of achieving a transverse mutual joining of superimposed running webs between which an additional, thermoplastic web is inserted, whereafter all the webs in the area where the joining is effected are subjected to heat and pressure. The chief characteristic of the method according to the invention is that the additional, thermoplastic web is inserted at a speed lower than that of the webs which are to be joined.

With the method according to the invention, the thermoplastic material in the additional web in the area of the intended joining is melted by the heat applied there and, because of the simultaneously exerted pressure, will squeeze the superimposed webs together so that they will be securely and dependably pressed together with the melted thermoplastic material acting as a binder. This is accomplished without any greater consumption of binder.

It has been proved particularly preferable to insert the additional, thermoplastic web between the webs to be joined at one side edge of said latter webs and at an angle to said edge. All the webs are then moved in the same direction. With such an insertion of the thermoplastic web, its lower speed can be accurately adapted relative to the higher speed of the webs to be joined.

As mentioned above, the invention is also directed to an apparatus for executing the method. Such an apparatus is basically characterized by feeding means intended for the webs to be joined, as well as for the additional web, and means for applying heat and pressure on all webs in the area where joining is to be effected. The feeding means for the additional web have a lower speed than the feeding means for the webs to be united, and are arranged as seen in the direction of the webs' movement in front of the heat and pressure applying means and at one side edge of the webs to be joined, in order to feed the additional web, at an angle to said side edge, between the superimposing webs.

The apparatus according to the invention obtains an exceptionally simple construction if the feeding means for the superimposed webs to be joined consist of two pairs of feed rollers, one pair being situated in front of the feeding means for the additional web and the other pair being placed after the heat and pressure applying means.

The feeding means for the additional web can advantageously consist of a pair of feed rollers placed at the side edge of the webs to be united. In order to make the additional web run in the same direction as the webs to be joined together, a known per se folding device may be arranged between the latter webs.

The heat and pressure applying means may suitably consist of a pair of co-operating rollers provided with heatable compressing and/or stamping elements which extend in the longitudinal direction of said rollers.

The invention is described below with reference to an embodiment schematically shown in the enclosed drawing.

The drawing reveals how two superimposed, continuous webs 1, 2 are joined together with transverse seams by the method and apparatus according to the invention and as shown schematically on the drawing.

The webs 1, 2 to be mutually united are fed forward by means of two pairs of feed rollers 3, 4 and 5, 6. The webs in question may be separate or consist of one folded web, the fold being located along the far side longitudinal edge of the web, as in the embodiment illustrated. The binder for effecting the joint consists of a web 9 of thermoplastic material. In the embodiment shown, this thermoplastic web is fed in by a pair of feed rollers 7, 8 placed at one side edge of the superimposed webs and between the two previously mentioned feed rollers 3, 4 and 5, 6 for the webs 1, 2 to be mutually joined together. The feed rollers 7, 8 feed the thermoplastic web 9 perpendicular to and between the webs 1, 2 to be united.

In order for the thermoplastic or binding web 9 to be moved in the same direction as the webs 1, 2 to be united, after having been fed between said webs 1, 2, it is made to pass over a known per se web folder or so-called sword 10 arranged between said webs 1, 2. The part of the thermoplastic web 9 lying behind the folder or sword 10 is in contact with the two webs 1, 2 and will thus be inclined to accompany these webs towards the heat and pressure applying means designed to effect the actual joining operation. In the present case, these heat and pressure applying means consist of a pair of co-operating rollers 11, 12 provided with heatable compressing and/or stamping elements 13, 14 extending in the longitudinal direction of said rollers. The propensity of the thermoplastic web 9 to follow the webs 1, 2 to be united is partially countered by the significantly lower feeding rate of the pair of rollers 7, 8 as compared with the feeding rate of the roller pairs 3, 4 and 5, 6. The contact between the thermoplastic web and the webs 1, 2 to be mutually joined together also counteracts any possible tendencies of the thermoplastic material to move in a direction opposite to that of its pair of feed rollers 7, 8 whose speed is co-ordinated with that of the pair of rollers 11, 12 which are responsible for the actual joining by means of heat and pressure, so that the rollers 7, 8, for each rotation of the rollers 11, 12, feeds only that amount of the thermoplastic web 9 which corresponds to the width of the joint. This width is marked on the drawing with the letter "A." Because of the significantly lower feeding rate of the pair of rollers 7, 8 as compared with the pair of rollers 11, 12 responsible for the joining together of the webs, the thermoplastic web 9 is secured at the moment of union and is then torn off along the line formed by the compressing and/or stamping elements 13, 14. The rollers 11, 12 may be equipped, if required, with knives for perforating the webs 1, 2, which have been transversely sealed, in the center of the seams. In the alternative, there may be cutting rollers which are placed downstream in the direction of movement of the webs and are synchronous with said rollers 11, 12. However, these options are not shown in the drawing.

This invention is not restricted to the above described embodiment which is shown on the drawing, but may be modified in various ways within the framework of the claims.

What is claimed is:

1. A method for transversely joining together continuous running webs at locations spaced apart lengthwise along said webs, comprising advancing said webs in superposed relationship at a first high speed past means urging said webs toward each other under heat and pressure, and advancing a thermoplastic web between the first-mentioned webs in the direction of travel of the first-mentioned webs but at a second speed substantially lower than said first speed with said thermoplastic web extending continuously up to the region in which said first-mentioned webs are urged toward each other whereby lengths of said thermoplastic web are seized between said first-mentioned webs in said region and torn off from said thermoplastic web.

2. A method as claimed in claim 1, and advancing said thermoplastic web toward said first-mentioned webs transversely of said first-mentioned webs and bending said thermoplastic web to alter the direction of said thermoplastic web to the same direction as said first-mentioned webs about a bend line disposed between said first-mentioned webs.

3. Apparatus for transversely joining together continuous running webs at locations spaced apart lengthwise along said webs, comprising means to advance two webs to be secured together in superposed relationship in one direction at a first speed, means to heat and press together said webs in the area where a joint between said webs is to be effected with said joints spaced apart longitudinally of said webs, and means to feed a thermoplastic web between said first-mentioned webs in said one direction at a second speed lower than said first speed with said thermoplastic web extending continuously up to the region of said heat and pressure means whereby said heat and pressure means presses said first-mentioned webs together to seize said thermoplastic web between them and to advance the seized portion of the thermoplastic web at said first speed while the remainder of said thermoplastic web continues to move at said second speed thereby tearing off said seized portion of said thermoplastic web from said remainder of said thermoplastic web by the action of said heat and pressure means.

4. Apparatus as claimed in claim 3, said feed means for said thermoplastic web comprising means for advancing said thermoplastic web between said first-mentioned webs in a direction transverse to said one direction, and means between said first-mentioned webs for bending said thermoplastic web to travel in said one direction.

5. Apparatus as claimed in claim 3, said heat and pressure means comprising a pair of rotatable heated rollers between which said webs pass and means for intermittently pressing said webs together between said rollers.

References Cited
UNITED STATES PATENTS

| | | | |
|---|---|---|---|
| 3,391,047 | 7/1968 | Kopp | 156—553 |
| 3,051,103 | 8/1962 | Williams | 156—93 |
| 3,232,808 | 2/1966 | Dries et al. | 156—510 XR |
| 2,971,874 | 2/1961 | Canno | 156—269 XR |
| 3,283,671 | 11/1966 | Campbell | 156—583 XR |
| 3,411,419 | 11/1968 | Becker et al. | 156—290 XR |
| 3,650,873 | 3/1972 | Smith et al. | 156—515 XR |

WILLIAM A. POWELL, Primary Examiner

U.S. Cl. X.R.

156—290, 306, 324, 515, 523, 553; 161—146